M. R. & G. E. BALENTI.
ATTACHMENT FOR JUMPING STANDARDS.
APPLICATION FILED APR. 14, 1915.
1,193,972.
Patented Aug. 8, 1916.
2 SHEETS—SHEET 1.
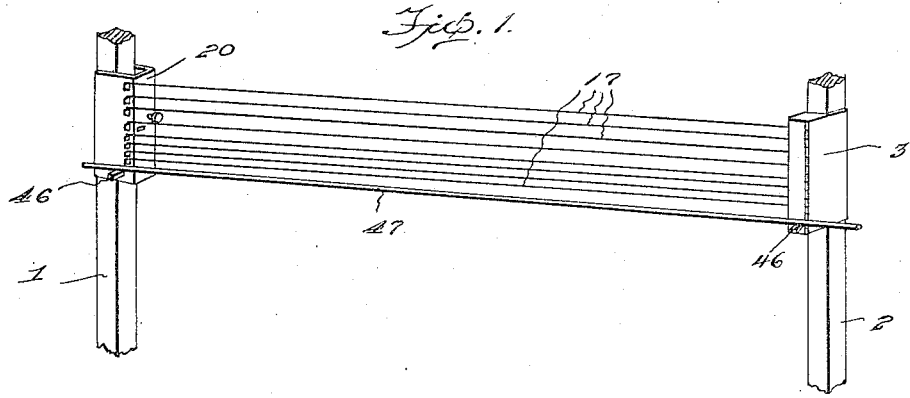
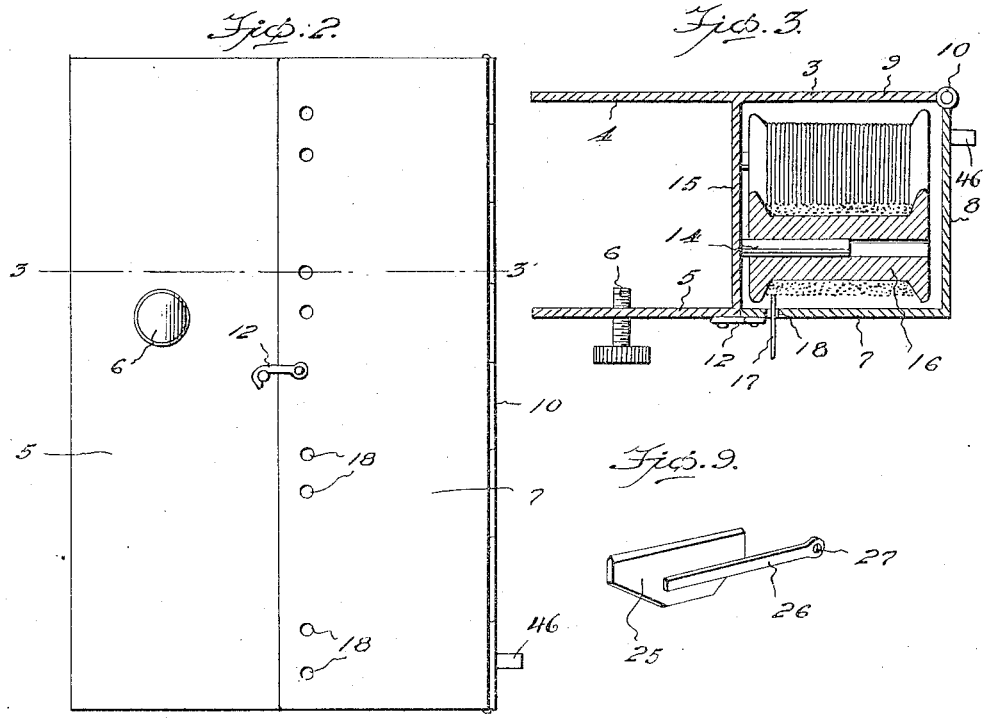

M. R. & G. E. BALENTI.
ATTACHMENT FOR JUMPING STANDARDS.
APPLICATION FILED APR. 14, 1915.
1,193,972.
Patented Aug. 8, 1916.
2 SHEETS—SHEET 2.
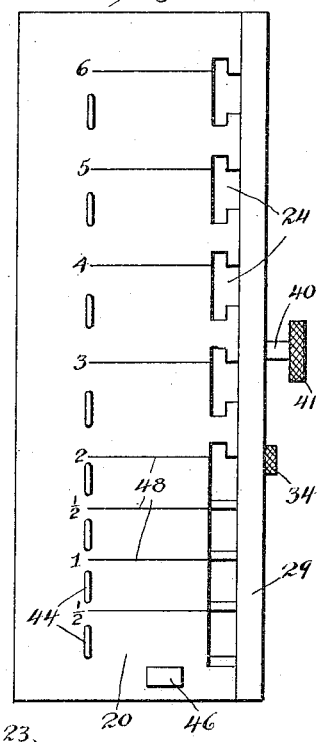
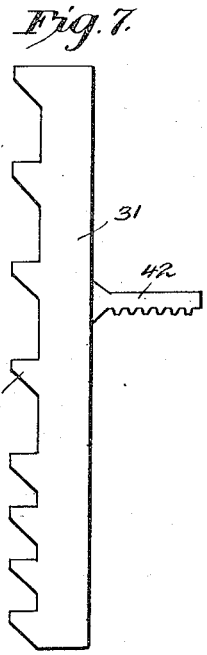
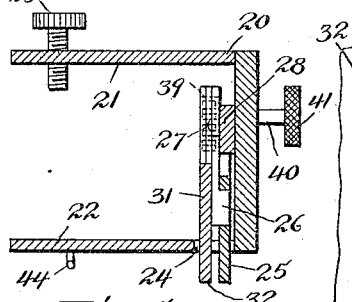
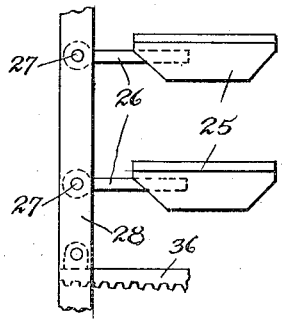
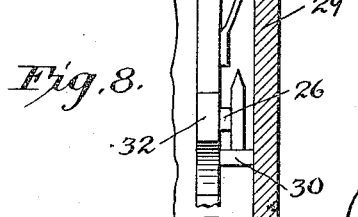
Inventor:
M. R. Balenti,
G. E. Balenti.

UNITED STATES PATENT OFFICE.

MICHAEL R. BALENTI AND GEORGE E. BALENTI, OF CALUMET, OKLAHOMA.

ATTACHMENT FOR JUMPING-STANDARDS.

1,193,972.　　　　　Specification of Letters Patent.　　Patented Aug. 8, 1916.

Application filed April 14, 1915. Serial No. 21,344.

*To all whom it may concern:*

Be it known that we, MICHAEL R. BALENTI and GEORGE E. BALENTI, citizens of the United States, residing at Calumet, in the county of Canadian and State of Oklahoma, have invented certain new and useful Improvements in Attachments for Jumping-Standards; and we do hereby declare the following to be a full, clear, and exact description of the invention, such as will enable others skilled in the art to which it appertains to make and use the same.

This invention relates to standards used for determining the height of high jumps, pole vaults, or analogous athletic endeavors, and the primary object of the invention is to provide an attachment for standards of this nature, which will accurately record substantially the exact height of the jump.

Another object of this invention is to provide an attachment as specified, which includes a pair of boxes or brackets for attachment to the vertical standards, one of which boxes carries a plurality of thread retaining spools, and the other box carries a plurality of knives and means for engaging the ends of the threads thereto, so that the threads may be stretched from one standard to the other, parallel with the ordinary type of cross bar used upon standards of this nature.

Another object of this invention is to provide means for moving the cutting knives into or out of a cutting engaging position, and also to provide a movable guard, for co-action with the knives.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a fragmentary perspective view of a pair of standards, showing the invention applied thereto, Fig. 2 is a side elevation of the thread retaining spool holding box, Fig. 3 is a cross sectional view on the line 3—3 of Fig. 2, Fig. 4 is a side elevation of the knife carrying box, Fig. 5 is a cross sectional view through the knife carrying box, Fig. 6 is a plan view of a plate for guiding the movement of the knife, Fig. 7 is a view of the knife guard, Fig. 8 is a fragmentary sectional view of the means for supporting the knife guard and moving it into or out of a position for preventing a cutting action of the knife, Fig. 9 is a detail perspective view of one of the knives, Fig. 10 is a longitudinal section through the thread retaining spool carrying box, showing the manner of staggeredly disposing the spools therein, and Fig. 11 is a fragmentary view of the knife carrying bar.

Referring more particularly to the drawings, 1 and 2 designate the ordinary standards used in various types of athletic competitive exercises, such as high jumping, pole vaulting or the like.

The standard 2 has a box 3 detachably secured thereto, which box is substantially rectangular shaped and has transversely extending flanges 4 and 5 formed upon one side thereof, which flanges are provided for engagement with the sides of the standard 2. A set screw 6 is carried by the flange 5, and is provided for engagement with the standard 2 for holding the box 3 in various adjusted positions thereon.

The sides 7 and 8 of the box 3 are connected, and they are hingedly connected to the side 9, as at 10, so as to permit of the opening of the box for access to the interior thereof. The hinged sides 7 and 8 are held in a closed position by means of a hook or analogous fastening device 12.

The box 3 has a plurality of transversely extending pins 14 secured to the inner surface of the side or wall 15 thereof, which pins are disposed in staggered relation with each other and are provided for rotatably supporting thread retaining spools 16. The thread retaining spools 16 have threads 17 wound thereon, which extend outwardly through the forward side 7 of the box, through openings 18, which are formed therein. The openings 18 are formed at predetermined distances from each other, such as half inches or inches, as desired, and the spools 16 are positioned so that the threads 17 may extend through the openings, and be freely fed therethrough.

The standard 1 has a support 20 mounted thereon, which is preferably U-shaped in cross section. The sides 21 and 22 of the supports are adapted for engagement with the sides of the standard 1. The side 21 has a set screw 23 carried thereby for engagement with the standard, for supporting the box in various elevations thereon. The side 22 is provided with a plurality of spaced openings 24, through which the knife blades 25 are adapted to extend. The knife blades 25 are carried by resilient or spring arms 26, which are secured as at 27 to a bar 28, which extends vertically through the box 20. The end 29 of the support 20 has a plurality of transversely extending ribs 30 carried thereby, which form guiding rests for the knives 25.

A guard member or plate 31 is slidably carried by the box 20, and it has a plurality of forwardly extending guard lugs 32 formed thereon, which are provided for positioning along side of the knives 25, for preventing the knives from cutting threads. The guard plate 31 has a flat spring 33 secured thereto, which flat spring is bowed outwardly, and has a thumb nut 34 secured thereto which extends outwardly through an opening 35 formed in the support 20. By sliding the thumb nut 34 upwardly or downwardly within the opening 35, the guard plate 32 may be moved upwardly or downwardly, for positioning their upper edges above the upper cutting edges of the knives 25, for supporting the threads upon the guard plate and preventing the knives from cutting them, or when moved downwardly, for moving the guard plate beneath the cutting edges of the knives and permitting the threads to rest upon the knives, the purpose of which will be hereinafter more fully described.

The bar 28 has a rack bar 36 secured thereto, the teeth of which mesh with a gear 39, which is mounted upon a shaft 40. The shaft 40 extends out of the support 20 through the end 29 and has a milled operating head 41 mounted upon its outer end. A rack bar 42 is formed upon the guard plate 31, and the teeth thereof mesh with the gear 39, so that the knives and the guard plate may be moved into the support 20, by the rotation of the shaft 40, or they may be moved outwardly, so that their outer ends will project beyond the flange or side plate 22 of the support, when it is desired. Any suitable means, indicated at 44, may be secured to the outer surface of the side or flange 22, to which the ends of the threads 17 may be attached. The box 3 and support 20 have transversely extending lugs 45 secured thereto near their lower ends, and extending outwardly therefrom, which are provided for supporting the ordinary type of cross bar 47, used upon standards of this nature. The plate 22 is provided with graduations 48, which are positioned for alinement with the upper cutting edges of the knives 25, and which are spaced at any predetermined distance apart, such as half inches or inches, as is clearly shown in Fig. 4 of the drawings.

When using the standard, the cross bar 47 is placed upon the lugs 46, in the ordinary manner, and the threads 17 are unwound from the spools 16, and stretched across from the standard 2 to the standard 1, above the edges of the knives 25 and the guard plates 32, and attached to the members 44. When the athlete is ready to jump, the guard plates 32 are shifted, so that the threads will rest upon the upper cutting edges of the knives 25. In case the athlete just clears the cross bar 47, each and every one of the threads 17 will be cut, by his engagement therewith, which will draw the threads over the cutting edges of the knives 25. Should the athlete clear the bar by two inches, the threads above the two inch mark will be broken, and those below will remain intact, thereby positively designating substantially the exact height of the jump of the athlete.

From the foregoing description taken in connection with the accompanying drawings the advantages of construction and of the method of operation of the improved attachment for jumping standards will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. The combination with a jumping standard including vertical standards and a cross bar, of a plurality of threads suspended between said standards above and parallel to the cross bar.

2. The combination with ordinary jumping standards including vertical standards and a cross bar, of a plurality of threads suspended between said standards above and parallel to said cross bar, and means for cutting said threads when engaged by a jumper.

3. The combination with an ordinary vaulting or jumping standard including vertical standards and a cross bar, of a plurality of thread retaining spools carried by one of said standards, means carried by the other standards for connection with the ends of threads unwound from said spools and suspended between said standards, said threads being positioned above and parallel to said cross bar, at spaced predetermined distances.

4. The combination with an ordinary jumping or vaulting standard including a pair of vertical standards, and a cross bar carried by said standards, of a box carried by one of said standards, a plurality of spools rotatably carried by said box, threads wound upon said spools, a plurality of devices carried by the other standards for engagement with the ends of the threads, said threads adapted for unwinding from said spools and suspension between said standards above and parallel to said cross bar.

5. The combination with an ordinary jumping or vaulting standard including a pair of vertical standards, and a cross bar carried by said standards, of a box carried by one of said standards, a plurality of spools rotatably carried by said box, threads wound upon said spools, a plurality of devices carried by the other standards for engagement with the ends of the threads, said threads adapted for unwinding from said spools and suspension between said standards above and parallel to said cross bar, a plurality of knives adjustably carried by the standards carrying the thread attaching means, and means for moving said knives into or out of a thread engaging position.

6. The combination with an ordinary jumping or vaulting standard including a pair of vertical standards, and a cross bar carried by said standards, of a box carried by one of said standards, a plurality of spools rotatably carried by said box, threads wound upon said spools, a plurality of devices carried by the other standards for engagement with the ends of the threads, said threads adapted for unwinding from said spools and suspension between said standards above and parallel to said cross bar, a plurality of knives adjustably carried by the standards carrying the thread attaching means, means for moving said knives into or out of a thread engaging position, a guard plate adjustably carried along side of said knives for movement into or out of a thread supporting position along side of the cutting edges of said knives.

In testimony whereof we affix our signatures in presence of two witnesses.

MICHAEL R. BALENTI.
GEORGE E. BALENTI.

Witnesses:
C. R. KENNEDY,
LESLIE THOMPSON.

Copies of this patent may be obtained for five cents each, by addressing the "Commissioner of Patents, Washington, D. C."